United States Patent
Yi et al.

(10) Patent No.: US 10,952,146 B2
(45) Date of Patent: Mar. 16, 2021

(54) METHOD FOR DYNAMICALLY ADJUSTING ENERGY-SAVING GRADE OF TERMINAL, NON-TRANSITORY COMPUTER-READABLE STORAGE MEDIUM, AND TERMINAL

(71) Applicant: Guangdong Oppo Mobile Telecommunications Corp., Ltd., Guangdong (CN)

(72) Inventors: Yongpeng Yi, Guangdong (CN); Deliang Peng, Guangdong (CN); Shengjun Gou, Guangdong (CN); Xiaori Yuan, Guangdong (CN); Gaoting Gan, Guangdong (CN); Zhiyong Zheng, Guangdong (CN); Hai Yang, Guangdong (CN)

(73) Assignee: GUANGDONG OPPO MOBILE TELECoMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/565,344

(22) Filed: Sep. 9, 2019

(65) Prior Publication Data
US 2020/0008153 A1   Jan. 2, 2020

Related U.S. Application Data

(63) Continuation of application No. PCT/CN2017/106601, filed on Oct. 17, 2017.

(30) Foreign Application Priority Data

Mar. 10, 2017 (CN) .......................... 201710142257.4

(51) Int. Cl.
*H04W 52/02* (2009.01)
*G09G 5/00* (2006.01)

(52) U.S. Cl.
CPC ........ *H04W 52/0261* (2013.01); *G09G 5/003* (2013.01); *G09G 2320/0666* (2013.01); *G09G 2320/08* (2013.01)

(58) Field of Classification Search
CPC .............. H04W 52/0261; G09G 5/003; G09G 2320/0666; G09G 2320/08
(Continued)

(56) References Cited

U.S. PATENT DOCUMENTS

| 2004/0104886 A1 | 6/2004 | Kawano |
| 2004/0104922 A1 | 6/2004 | Kawano |

(Continued)

FOREIGN PATENT DOCUMENTS

| CN | 103050108 A | 4/2013 |
| CN | 103092551 A | 5/2013 |

(Continued)

OTHER PUBLICATIONS

Extended European search report issued in corresponding European application No. 17899984.3 dated Jan. 9, 2020.

(Continued)

*Primary Examiner* — Ayodeji O Ayotunde

(57) ABSTRACT

A method for dynamically adjusting an energy-saving grade of a terminal, a non-transitory computer-readable storage medium, and the terminal are provided. The method includes: acquiring an application identifier of a currently displayed application; determining, by querying a preset first white list, a first energy-saving grade corresponding to the application according to the application identifier, and acquiring display effect parameters corresponding to the first energy-saving grade, where the first white list defines an association relationship between a plurality of application identifiers and a plurality of energy-saving grades; and setting an energy-saving grade of the terminal according to (Continued)

the first energy-saving grade, and processing a to-be-displayed image according to the display effect parameters corresponding to the first energy-saving grade.

17 Claims, 11 Drawing Sheets

(58) Field of Classification Search
USPC .......................................................... 455/574
See application file for complete search history.

(56) References Cited

U.S. PATENT DOCUMENTS

2015/0261284 A1* 9/2015 Lee ..................... G06F 1/206
713/323
2015/0269709 A1 9/2015 Zhao et al.

FOREIGN PATENT DOCUMENTS

| CN | 103513748 A | 1/2014 |
|----|-------------|--------|
| CN | 103685716 A | 3/2014 |
| CN | 103699304 A | 4/2014 |
| CN | 105100411 A | 11/2015 |
| CN | 105204734 A | 12/2015 |
| CN | 105278811 A | 1/2016 |
| CN | 105913790 A | 8/2016 |

OTHER PUBLICATIONS

International search report issued in corresponding international application No. PCT/CN2017/106601 dated Jan. 19, 2018.

* cited by examiner

100
METHOD FOR DYNAMICALLY ADJUSTING ENERGY-SAVING GRADE OF TERMINAL, NON-TRANSITORY COMPUTER-READABLE STORAGE MEDIUM, AND TERMINAL

CROSS-REFERENCE TO RELATED APPLICATION(S)

This application is a continuation application of International Application No. PCT/CN2017/106601, filed on Oct.17, 2017, which claims priority to and the benefit of Chinese Patent Application No. 201710142257.4, filed on Mar. 10, 2017, the entire disclosure of both of which are hereby incorporated by reference in their entireties.

TECHNICAL FIELD

The present disclosure relates to the technology field of terminals, and more particularly to a method for dynamically adjusting an energy-saving grade of a terminal, a non-transitory computer-readable storage medium, and the terminal.

BACKGROUND

With the development of mobile terminal technology, the processing ability and functions of mobile terminals have been greatly improved, and the mobile terminals have become a necessity in people's life, work and entertainment.

Taking a smart phone as an example, in the existing technology, a smart phone usually has a touch display screen, which can provide a user with a larger area of display and operation space. For example, after the touch screen is used in the smart phone, the user can easily play games, watch videos, read news, and the like on the smart phone. However, with the increasing screen size of the smart phone, the power consumption of the display screen has an increasing influence on the endurance ability, which makes the shortage of the endurance ability of the smart phone more and more prominent.

SUMMARY

Implementations of the present disclosure provide a method for dynamically adjusting an energy-saving grade of a terminal, a non-transitory computer-readable storage medium, and the terminal.

In a first aspect, an implementation of the present disclosure provides a method for dynamically adjusting an energy-saving grade of a terminal. The method includes the following. An application identifier of a currently displayed application is acquired. A first energy-saving grade corresponding to the application is determined according to the application identifier by querying a preset first white list, and display effect parameters corresponding to the first energy-saving grade are acquired, where the first white list defines an association relationship between a plurality of application identifiers and a plurality of energy-saving grades. An energy-saving grade of the terminal is set according to the first energy-saving grade, and a to-be-displayed image is processed according to the display effect parameters corresponding to the first energy-saving grade.

In a second aspect, an implementation of the present disclosure further provides a non-transitory computer-readable storage medium. The non-transitory computer-readable storage medium is configured to store computer programs which, when executed by a processor, cause the processor to carry out following actions. An application identifier of a currently displayed application is acquired. A first energy-saving grade corresponding to the application is determined according to the application identifier by querying a preset first white list, and display effect parameters corresponding to the first energy-saving grade are acquired, where the first white list defines an association relationship between a plurality of application identifiers and a plurality of energy-saving grades. An energy-saving grade of the terminal is set according to the first energy-saving grade, and a to-be-displayed image is processed according to the display effect parameters corresponding to the first energy-saving grade.

In a third aspect, an implementation of the present disclosure provides a terminal, which includes a processor and a computer readable storage coupled to the processor. The computer readable storage stores computer programs thereon, which when executed by the processor, cause the processor to perform the following actions. An application identifier of a currently displayed application is acquired. A first energy-saving grade corresponding to the application is determined according to the application identifier by querying a preset first white list, and display effect parameters corresponding to the first energy-saving grade are acquired, where the first white list defines an association relationship between a plurality of application identifiers and a plurality of energy-saving grades. An energy-saving grade of the terminal is set according to the first energy-saving grade, and a to-be-displayed image is processed according to the display effect parameters corresponding to the first energy-saving grade.

BRIEF DESCRIPTION OF THE DRAWINGS

To describe technical solutions in the implementations of the present disclosure or of the related art more clearly, the following briefly introduces the accompanying drawings required for describing the implementations of the present disclosure or the related art. Apparently, the accompanying drawings in the following description only illustrate some implementations of the present disclosure. Those of ordinary skill in the art may also obtain other drawings based on these accompanying drawings without creative efforts.

DETAILED DESCRIPTION

Figure 1:
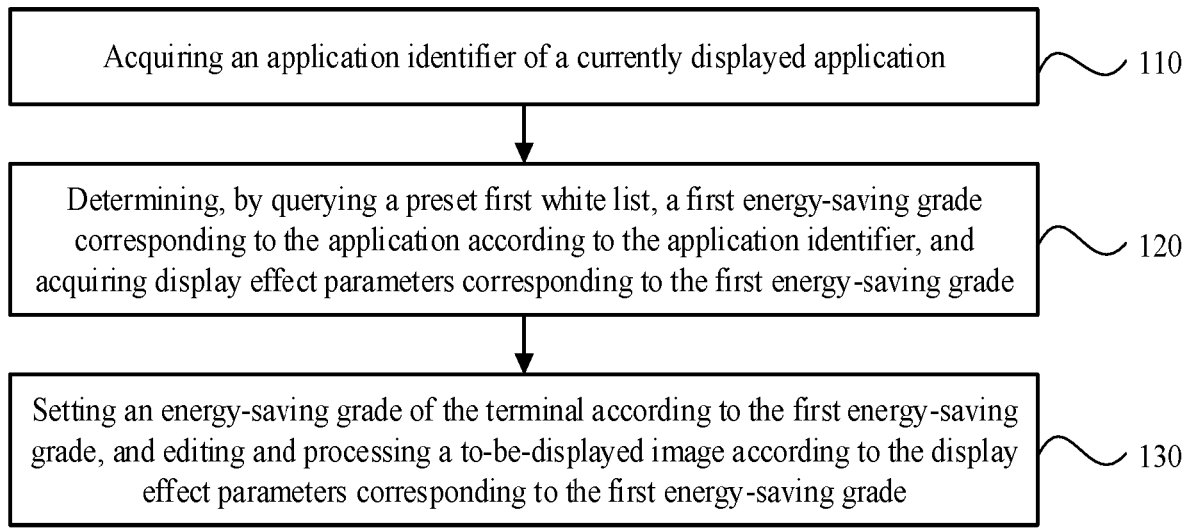
FIG. 1 is a flowchart of a method for dynamically adjusting an energy-saving grade of a terminal according to an implementation of the present disclosure.

The present disclosure will be further described in detail below with reference to the accompanying drawings and implementations. It should be understood that the specific implementations described herein are merely illustrative of the present disclosure, rather than being intended to limit the present disclosure. It should also be noted that, for ease of description, only part, not all, of the structures related to the present disclosure are shown in the drawings.

Before discussing the exemplary implementations in more detail, it should be noted that some exemplary implementations are described as processes or methods depicted as flowcharts. Although the flowcharts describe various operations (or steps) as a sequential process, many of the operations can be implemented in parallel, concurrently or concurrently. In addition, the order of operations can be rearranged. The process may be terminated when its operation is completed, but may also have additional steps not included in the drawings. The processing may correspond to methods, functions, procedures, subroutines, subroutines, and the like.

The details will be described separately below.

According to an implementation of the present disclosure, a method for dynamically adjusting an energy-saving grade of a terminal is provided. The method includes the following: acquiring an application identifier of a currently displayed application; determining, by querying a preset first white list, a first energy-saving grade corresponding to the application according to the application identifier, wherein the first white list defines an association relationship between a plurality of application identifiers and a plurality of energy-saving grades; acquiring display effect parameters corresponding to the first energy-saving grade; and setting an energy-saving grade of the terminal according to the first energy-saving grade, and processing a to-be-displayed image according to the display effect parameters corresponding to the first energy-saving grade.

In some implementations, the method further includes the following: acquiring, according to a first preset cycle, a current energy-saving grade of the terminal; determining, according to the current energy-saving grade, whether an energy-saving function of the terminal is invalid; and restarting the energy-saving function in response to a determination that the energy-saving function of the terminal is invalid.

In some implementations, the method further includes the following: querying a preset second white list, and determining whether the application identifier belongs to the preset second white list, wherein the preset second white list includes a plurality of application identifiers whose corresponding applications have rights to adjust their own energy-saving grades; in response to a determination that the application identifier belongs to the preset second white list, acquiring screenshots of the application in a preset duration by performing, according to a second preset cycle, screen capture processing on the application; determining target screenshots by analyzing histograms of the screenshots, and determining the number of the target screenshots, wherein the target screenshots are the screenshots that satisfy a first preset condition, wherein the histogram of each target screenshots contains a plurality of target gray scales, wherein the number of pixels corresponding to each target gray scale exceeds a preset first quantity threshold, and the first preset condition is that the number of the target gray scales contained in the histogram of the target screenshot exceeds a preset second quantity threshold; and determining that a second preset condition of adjusting the energy-saving grade is satisfied when the number of target screenshots exceeds a preset third quantity threshold, and performing the action of determining the first energy-saving grade corresponding to the application according to the application identifier.

In some implementations, the method further includes the following: monitoring status parameters of the terminal, wherein the status parameters include at least one of a battery power, a battery temperature, and a screen brightness; and performing the action of acquiring the application identifier of the currently displayed application when the status parameters satisfy a third preset condition.

In some implementations, the status parameters include the battery power. The method further includes: comparing the battery power with a preset power threshold; and determining that the battery power satisfies the third preset condition in response to a determination that the battery power is less than the preset power threshold.

In some implementations, the status parameters include the battery temperature. The method further includes: comparing the battery temperature with a preset temperature threshold; and determining that the battery temperature satisfies the third preset condition in response to a determination that the battery temperature exceeds the preset temperature threshold.

In some implementations, the status parameters include the screen brightness. The method further includes: comparing the screen brightness with a preset brightness threshold; and determining that the screen brightness satisfies the third preset condition in response to a determination that the screen brightness is higher than the preset brightness threshold.

In some implementations, when the energy-saving grade is a fidelity optimized signal scaling (FOSS) grade, the action of acquiring the display effect parameters corresponding to the first energy-saving grade includes: reading a FOSS configuration file by calling a preset configuration file access interface, and acquiring the display effect parameters corresponding to a first FOSS grade according to the FOSS configuration file, wherein the FOSS configuration file stores a plurality of FOSS grades, a plurality of groups of display effect parameters, and a mapping list defining an association relationship between the energy-saving grades and the display effect parameters.

The action of processing the to-be-displayed image according to the display effect parameters corresponding to the first energy-saving grade includes: transmitting the display effect parameters to an algorithm setting module, to cause a FOSS module to adjust color gradation of the to-be-displayed image according to the display effect parameters received in the algorithm setting module and display the adjusted to-be-displayed image.

In some implementations, the action of setting the energy-saving grade of the terminal according to the first energy-saving grade, and processing the to-be-displayed image according to the display effect parameters corresponding to the first energy-saving grade includes: determining energy-saving grades respectively corresponding to each of at least two applications, when the currently displayed application includes the at least two applications; and comparing the energy-saving grades respectively corresponding to each of the at least two applications, and adjusting the energy-saving grade of the terminal according to a lowest energy-saving grade among the energy-saving grades.

In some implementations, the action of setting the energy-saving grade of the terminal according to the first energy-saving grade, and processing the to-be-displayed image according to the display effect parameters corresponding to the first energy-saving grade includes: monitoring operation frequencies respectively corresponding to each of at least two applications, when the currently displayed application includes the at least two applications; and comparing the operation frequencies respectively corresponding to each of the at least two applications, and adjusting the energy-saving grade of the terminal according to an energy-saving grade corresponding to an application with the highest operation frequency.

FIG. 1 is a flowchart of a method for dynamically adjusting an energy-saving grade of a terminal according to an implementation of the present disclosure. The method may be performed by an apparatus for dynamically adjusting an energy-saving grade of the terminal. The apparatus may be integrated into the terminal, and the terminal may be a mobile terminal such as a smart phone, a tablet computer, hand-held game console, etc.

The method includes the following actions at blocks illustrated in FIG. 1.

At block 110, an application identifier of a currently displayed application is acquired.

As an example, a window displayed in the current screen may be determined by a window manager service (WMS), and then the application identifier of the application displayed in the window is acquired. In an Android® system, the WMS is used to manage all windows in the system, including display, hiding or switching of the windows.

The application identifier is a unique identifier that distinguishes an application from other applications. For example, the application identifier may be an application package name or a process name.

It can be understood that the method for determining the currently displayed application is not limited to the ways listed in the above examples, but also can determine the application running in the foreground through the process management services provided by the Android® system. For example, for a terminal based on the Android® system, the application running in the foreground can be determined by Process.myPid( ) and RunningAppProcessInfo.

At block 120, a first energy-saving grade corresponding to the application is determined according to the application identifier by querying a preset first white list, and display effect parameters corresponding to the first energy-saving grade are acquired.

The energy-saving function of the terminal is subdivided into multiple energy-saving grades according to application scenarios. In the implementation, the application scenarios may include a pure white scenario, a pure black scenario, a scenario with frequent gray scale transitions, a dynamic scenario, a static scenario, a transparent scenario, a semi-transparent scenario, etc., which are predefined. The application scenarios may also be different preset applications. Different energy-saving grades have different effect parameters and power-saving degrees. The first energy-saving grade represents any one of the multiple energy-saving grades.

The energy-saving grade may be a fidelity optimized signal scaling (FOSS) grade, or a content adaptive brightness control (CABC) grade.

In the implementation, FOSS reduces the power consumption of an OLED screen by optimizing image display effect based on human visual system (HVS) domain. In some implementations, a new histogram is obtained by recalculating the histograms of different display contents, and the display contents corresponding to the new histogram are displayed on the screen, so that a purpose of reducing power consumption can be achieved by reducing color gradation under the premise of ensuring the display effect.

For example, six FOSS grades (i.e., grade 0 to grade 5) may be preset, the display effect parameters corresponding to each FOSS grade are pre-configured according to the application scenarios, and each FOSS grade has different effect parameters and energy saving degrees. The grade 0 indicates that the FOSS function is off and the power is not saved. From grade 1 to grade 5, the corresponding energy-saving degrees are gradually increased, and the corresponding display effect gradually becomes worse.

In the implementation, CABC performs statistical analysis on the image of a to-be-displayed picture, adjusts the brightness of the to-be-displayed picture, and reduces the brightness of the backlight, to cause the display screen to display the adjusted to-be-displayed picture with the=–09876 reduced backlight brightness. Therefore, the power consumption is reduced on the basis of ensuring the display effect. CABC technology is a backlight-driven energy-saving technology provided in a liquid crystal display (LCD) driving IC. It can be used in conjunction with sunlight readable enhancement (SRE, which is used to increase display contrast and enhance visibility in strong light).

It can be understood that the number of the energy-saving grades is not limited to the number listed in this example, but can also be preset according to actual needs. For example, three, four, or five FOSS grads or CABC grades can be preset.

In the implementation, an association relationship between the application identifiers and the energy-saving grades is defined in the first white list. The first white list may be pre-configured in the terminal before the terminal leaves the factory. For example, the applications that are commonly used by the user are counted as the preset applications. The energy-saving grades of the preset applications are adapted to terminals of different types and different display screens. For the same type of terminals with the same display screen, the effect parameters corresponding to one of the multiple energy-saving grades are respectively used to process the display content of the application running in the foreground of the terminal, and the energy-saving grade of the application is determined according to a way of balancing the display effect and the power-saving degree. After the energy-saving grade of the application is determined, the corresponding relationship between the application and the energy-saving grade is predefined in the first white list.

The first white list may be updated online after the terminal is activated or used by the user. For example, when the terminal updates the version of the operating system, the first white list built in the terminal can be updated at the same time. For another example, the server of the terminal manufacturer pushes the first white list update message to the terminal to prompt the user to update the first white list.

After the application identifier of the currently displayed application is determined, the first energy-saving grade matching the application identifier is acquired according to the application identifier by querying the preset first white list. Then, a configuration file storing a plurality of energy-saving grades, a plurality of groups of display effect parameters, and a mapping list defining an association relationship between the energy-saving grades and the display effect parameters is accessed by using a preset interface, and the display effect parameters corresponding to the first energy-saving grade are obtained according to the configuration file. For example, when the energy-saving grade is a FOSS grade, a preset configuration file access interface is called to read a FOSS configuration file, and the display effect parameters corresponding to a first FOSS grade are obtained according to the FOSS configuration file. In the implementation, the FOSS configuration file stores a plurality of FOSS grades, a plurality of groups of display effect parameters, and a mapping list defining an association relationship between the FOSS grades and the display effect parameters.

At block 130, an energy-saving grade of the terminal is set according to the first energy-saving grade, and a to-be-displayed image is processed according to the display effect parameters corresponding to the first energy-saving grade.

Specifically, the current energy-saving grade of the terminal is set to be the first energy-saving grade. The display effect parameters corresponding to the first energy-saving grade are transmitted to an algorithm setting module, so that an image adjusting module adjusts the image corresponding to the current scenario mode according to the display effect parameters received in the algorithm setting module. The image adjustment module may be a FOSS module or a CABC module. For example, the display effect parameters corresponding to the first energy-saving grade are transmitted to the algorithm setting module, so that the FOSS module adjusts the color gradation of the to-be-displayed image according to the display effect parameters received in the algorithm setting module, and displays the adjusted to-be-displayed image.

It can be understood that the adjustment of the to-be-displayed image in this implementation is not limited to the adjustment of the color gradation of the to-be-displayed image, and the parameters such as contrast, brightness, and the like of the image may also be adjusted, or the color gradation, contrast, brightness, and the like may be comprehensively adjusted.

When the currently displayed application changes, the energy-saving grade of the terminal can be adjusted through the energy-saving grade service layer. The energy-saving grade service layer is a function module pre-configured in the terminal for automatically matching the best effect and energy-saving grade according to the application scenario, so that the energy-saving grade can be flexibly switched according to different application scenarios. For example, the terminal is pre-configured with the FOSS service layer before leaving the factory. By detecting the currently displayed application using the ways provided by the FOSS service layer, determining the corresponding energy-saving grade, and setting the energy-saving grade of the terminal according to the newly determined energy-saving grade, the FOSS grade having the best display effect and power-saving degree can be automatically matched according to the scenario, so that the FOSS grade can be flexibly switched according to different scenarios, and the dual purposes of optimal display effect and power saving can be achieved.

It can be understood that when at least two applications are simultaneously displayed in the current screen, the energy-saving grades respectively corresponding to each of the applications are determined. Then, the energy-saving grades are compared, and the energy-saving grade of the terminal is adjusted according to a lowest energy-saving grade among the energy-saving grades, that is, to-be-displayed contents are adjusted according to the parameters corresponding to the lowest energy-saving grade, and the adjusted to-be-displayed contents are sent to the display screen for display. Alternatively, operation frequencies of the user for the at least two applications displayed at the same time may also be monitored, and the energy-saving grade of the terminal is adjusted according to an energy-saving grade corresponding to an application with the highest operation frequency.

According to the technical solution of the present implementation, the application identifier of the currently displayed application is acquired, the first energy-saving grade corresponding to the application is determined according to the application identifier by querying the preset first white list, and the display effect parameters corresponding to the first energy-saving grade are acquired. The energy-saving grade of the terminal is set according to the first energy-saving grade, and the to-be-displayed image is processed according to the display effect parameters corresponding to the first energy-saving grade, therefore, the power consumption of the terminal can be dynamically adjusted according to the application scenarios. The technical solution of the present disclosure can reduce the power consumption of the terminal while taking into account the display effect, and prolong the endurance time of the terminal.

Figure 2:
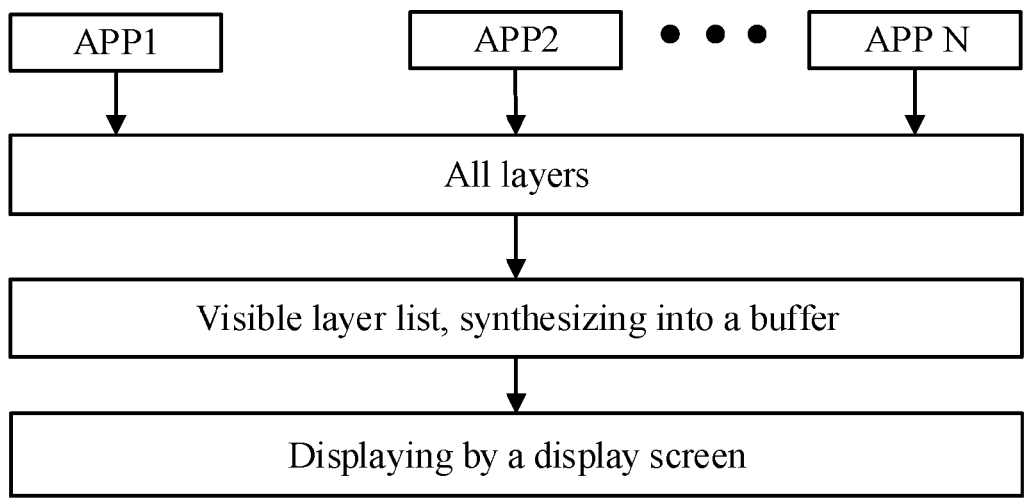
FIG. 2 is a schematic diagram of a display process according to an implementation of the present disclosure.

In order to facilitate understanding, an Android® system is taken as an example to briefly describe a process from generation to display of the image displayed in the Android® system. FIG. 2 is a schematic diagram of a display process according to an implementation of the present disclosure.

First, in an application layer, each application program (hereinafter referred to as an application or APP) contains one or more image layers, and the applications APP1, APP2 . . . APPN each performs, according to its own application design (usually decided by corresponding installation package APK), layer rendering operations (that is, graphing images on the layers). After the rendering operations are completed, all the layers rendered by each of the applications are sent to a layer synthesizing module (surface flinger) that performs a layer synthesis operation.

Then, in an application framework layer, all layers (including visible and invisible layers) create a list of layers which is defined as ListAll. The layer synthesizing module selects the visible layers from the ListAll to create a visible layer list which is defined as DisplayList. Then, the layer synthesizing module finds an idle frame buffers (FB) from three reusable frame buffers in the system, and superimposes, on the idle FB, the layers contained in the DisplayList through an synthesis (compose) operation, according to application configuration information, such as which layer should be bottomed, which layer should be topped, which area should be visible, and which area should be transparent, etc., to obtain a final to-be-displayed image.

Finally, in a Kernel layer, the to-be-displayed image can be transmitted to a display hardware (including a display controller and a display screen), so that the to-be-displayed image is finally displayed on the display screen. Types of the display screen are not limited herein, which may be, for example, a liquid crystal display (LCD), or an organic light emitting display (OLED).

Figure 3:
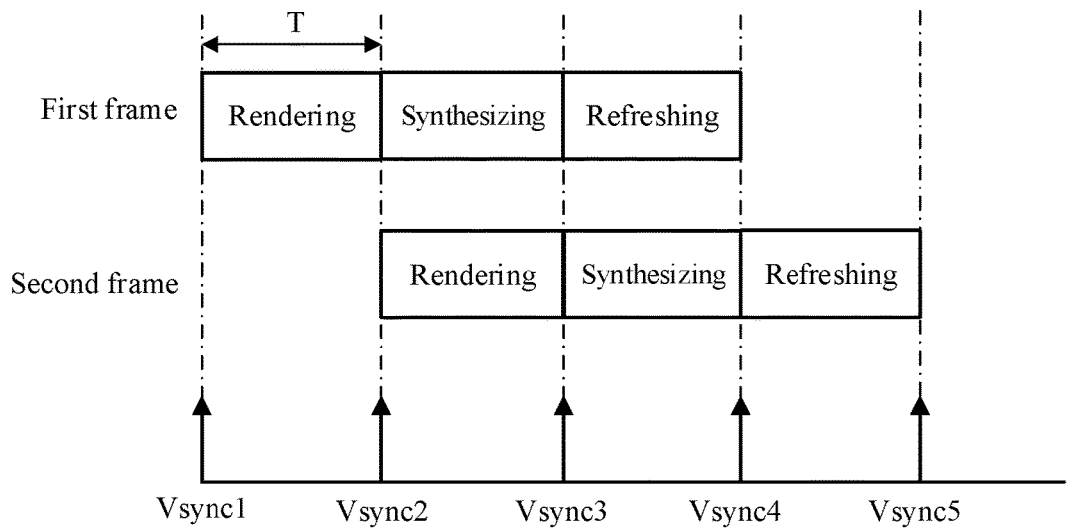
FIG. 3 is a schematic diagram of a Vsync display refresh mechanism according to an implementation of the present disclosure.

In addition, the Android® system introduces a synchronization (Vsync) refresh mechanism during the display refresh process. FIG. 3 is a schematic diagram of a Vsync display refresh mechanism according to an implementation of the present disclosure. Specifically, the Vsync refresh mechanism actually refers to inserting a "heartbeat" (i.e., a system synchronization (Vsync) signal) into an entire display process, and send the signal through the display controller to a central processing unit (CPU) for generating a Vsync interrupt, so as to control that each layer rendering operation and layer synthesis operation needs to be done according to the heartbeat, so that key steps in the entire display process are incorporated into the unified management mechanism of the Vsync. At present, the frequency of the Vsync signal is usually 60 Hz.

As illustrated in FIG. 3, assuming that a cycle of the Vsync signal is T, without considering signal transmission delays, when a first Vsync signal Vsync1 reaches the CPU, the CPU forwards the first Vsync signal Vsync1 to each application, and each application starts the rendering operation in responds to user's touch sliding operation on the display screen. When each application completes the rendering operation, multiple layers rendered by each application are obtained. When a second Vsync signal Vsync2 reaches the CPU, the CPU forwards the second Vsync signal Vsync2 to the layer synthesizing module, and the layer synthesizing module starts to perform a layer synthesizing operation, and synthesizes the multiple layers rendered by each application to generate the to-be-displayed image. When a third Vsync signal Vsync3 reaches the CPU, the system starts to perform a display refresh operation and finally displays the to-be-displayed image on the display screen. It can be seen from the above description that, the frequency of the Vsync signal received by the application, the layer synthesizing module, and the display screen is the same, and is a fixed value set in advance.

In the process of rendering, synthesizing, and refreshing display of the layers of the terminal, there are three kinds of frame rates: a rendering frame rate, a synthesizing frame rate, and a refreshing rate.

The rendering frame rate is a frame rate that triggers the layer synthesizing module to perform a layer synthesis operation after the rendering of the layer is completed, and can be understood as the number of layer frames rendered per unit time (for example, one second). The rendering frame rate includes a rendering frame rate of the application and a rendering frame rate of the layer. There may be multiple applications running in the system. Each application may include multiple layers. For example, a video player application generally includes three layers: a layer for displaying video contents, which can be defined as U1; two SurfaceView-type layers, one of them for displaying the barrage contents, which can be defined as U2, and the other for displaying user interface (UI) controls (such as playback progress bar, volume control bar, various control buttons, etc.) and advertisements, which can be defined as U3. The rendering frame rate of the application is the number of times that the application performs the rendering operation in a unit time, and one or more layers may be rendered in one rendering operation. The rendering frame rate of the layer is the number of times in which the layers having the same number or name (such as U1, U2, or U3 described in the previous section) are triggered to be rendered in unit time.

The synthesizing frame rate is a frame rate of a to-be-displayed image combined by the layers rendered by each application, and can be understood as the number of frames synthesized per unit time.

The refresh rate is a frame rate at which the display screen of the terminal is refreshed. Typically, the display screen will be refreshed at a refresh rate of 60 Hz.

Figure 4:
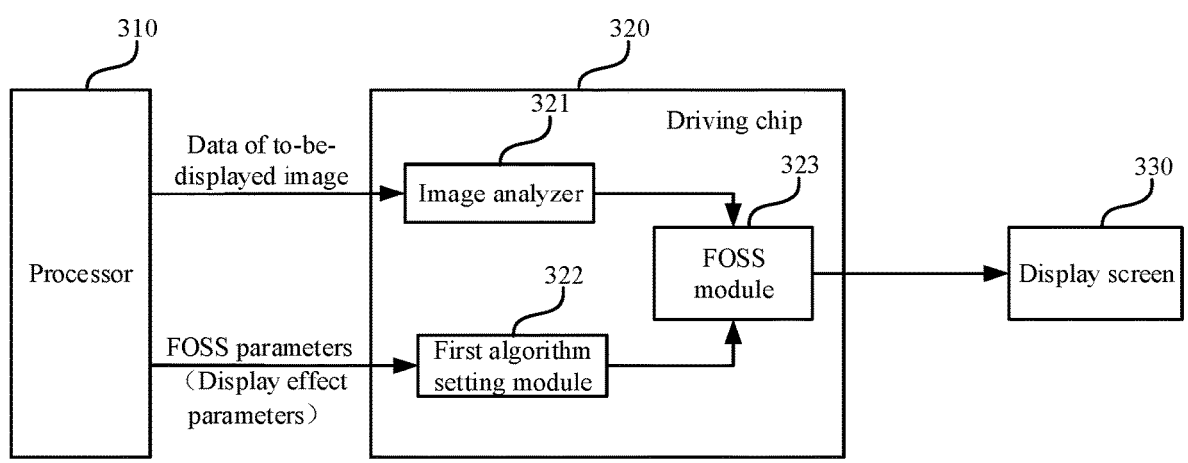
FIG. 4 is a schematic diagram of an energy-saving mechanism of a FOSS-based display screen according to an implementation of the present disclosure.

In addition, the Android® system introduces an energy-saving mechanism of the display screen in the process of transmitting the to-be-displayed image to display hardware. FIG. 4 is a schematic diagram of an energy-saving mechanism of a FOSS-based display screen according to an implementation of the present disclosure. As illustrated in FIG. 4, a processor 310 can not only transmit the data of the to-be-displayed image to an image analyzer 321 of a driving chip 320 of a display screen 330, but may also input the display effect parameters corresponding to the current FOSS grade of the terminal to a first algorithm setting module 322 for storage. The data of the to-be-displayed image is the image data that needs to be displayed on the display screen 330. After the image analyzer 321 receives the data of the to-be-displayed image from the processor 310, the image analyzer 321 can analyze the data, so as to obtain information such as color, contrast, and gray scale values of the image for subsequent processing. After the analysis of the data of the to-be-displayed image is completed, the image analyzer 321 sends the analyzed data to a FOSS module 323. The FOSS module 323 uses preset algorithms and the display effect parameters stored in the first algorithm setting module 322 to process the analyzed data. For example, for pixels whose color gradation values meet the adjustment requirement of the display effect parameters, adjustments are made, and adjustment of gray scale brightness may not be performed on the remaining pixels.

In some implementations, the FOSS grade is preset to correspond to the display effect parameters. Taking the grade one as an example, a grade number and a corresponding application scenario (for example, the application scenario is a video scenario) of the grade one is preset. At the same time, first parameters corresponding to the FOSS grade, such as contrast, image update delay count, power-saving step, power-saving input parameters, and power-saving output parameters, are configured. The contrast represents an enhancement degree of contrast provided by the FOSS grade, whose value ranges from 0 to 255, where 0 represents no contrast enhancement processing, and 255 represents a preset maximum value for contrast enhancement processing. The image update delay count represents a time interval that the algorithm adjusts the image. For example, if the value of the image update delay count is 3, the algorithm is considered to adjust one frame every three milliseconds. The power-saving step represents boundaries of a preset color gradation interval, whose value ranges from 0 to 255. The larger the step size, the more the color gradation intervals of the image are. The power-saving input parameters represents the color gradation values of the pixels included in the displayed screen, whose values range from 0 to 1023, where 0 represents black and 1023 represents white. The power-saving rate output parameters represents that the color gradation values of the pixels included in the power-saving input parameters are mapped to a preset gray scale brightness interval according to a preset algorithm rule. The values of the power-saving rate output parameters range from 1 to 255, from 1 to 255, the power-saving degrees decrease gradually, where 1 represents the highest power-saving degree, and 255 represents no power saving.

For example, if the power-saving step is 4, the power saving input parameters are 32, 48, 700, and 788, and the power saving output parameters are 255, 204, 204, and 192, then taking 32, 48, 700, and 788 as boundaries, a to-be-displayed image with a color gradation range of 0-1023 is divided into a plurality of intervals. The color gradation values in a first interval [0, 32] are mapped to 255 (that is, in the to-be-displayed image, the power-saving degree corresponds to the color gradation value 0 is 255, . . . the power-saving degree corresponds to the color gradation value 10 is 255, and the power-saving degree corresponds to the color gradation value 32 is 255), the color gradation values in a second interval [33, 48] are mapped to 204, the color gradation values in a third interval [48, 700] are mapped to 204, and the color gradation values in a fourth interval [701, 788] are mapped to 204. Alternatively, the contrast and gray scale brightness of the to-be-displayed image are also adjusted.

The FOSS module 323 can transmit the processed data of the to-be-displayed image to the display screen 330. The display screen 330 is an organic light emitting display (OLED) or an active matrix/organic light emitting diode (AMOLED) screen.

Figure 5:
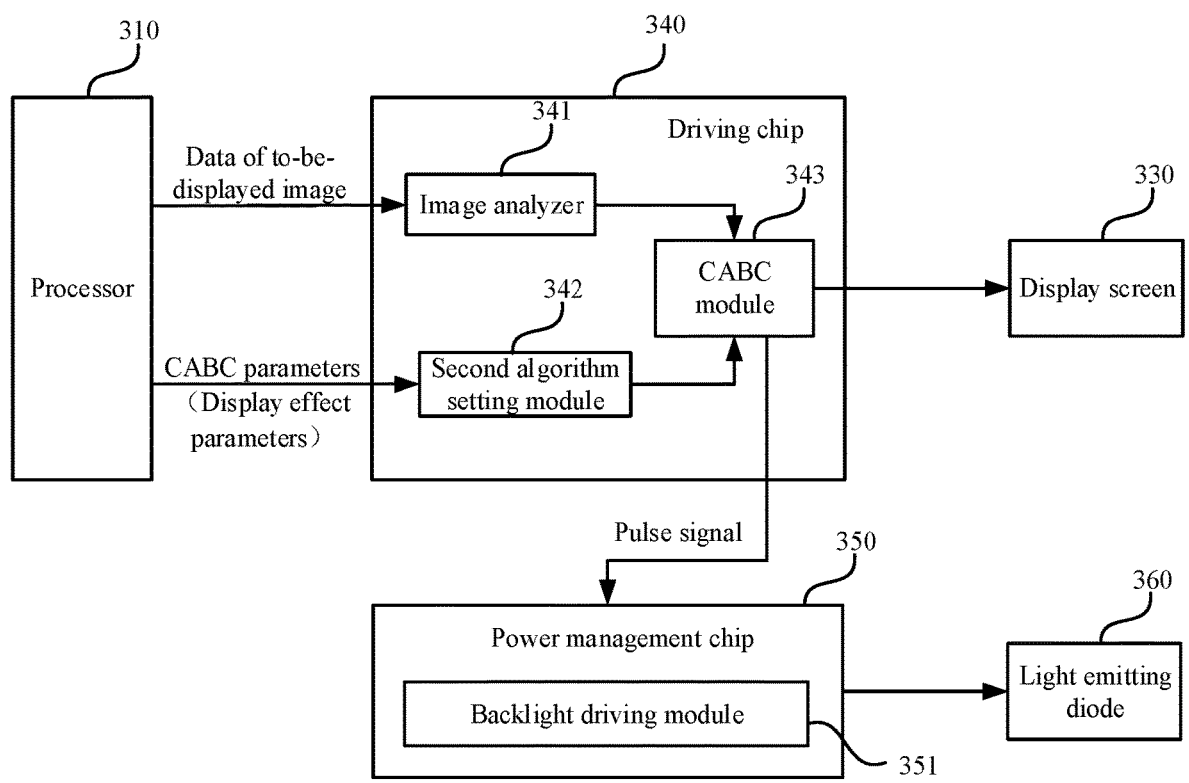
FIG. 5 is a schematic diagram of an energy-saving mechanism of a CABC-based display screen according to an implementation of the present disclosure.

FIG. 5 is a schematic diagram of an energy-saving mechanism of a CABC-based display screen according to an implementation of the present disclosure. As illustrated in FIG. 5, a processor 310 can not only transmit the data of the to-be-displayed image to an image analyzer 341 of a driving chip 340 of the display screen 330, but may also input CACB parameters corresponding to the current CABC grade of the terminal to a second algorithm setting module 342 for storage. The data of the to-be-displayed image is the image data that needs to be displayed on the display screen 330. After the image analyzer 341 receives the data of the to-be-displayed image from the processor 310, the image analyzer 341 can analyze the data, so as to obtain information such as color, contrast, and gray scale values of the image for subsequent processing. After the analysis of the data of the to-be-displayed image is completed, the image analyzer 341 sends the analyzed data to a CABC module 343. The CABC module 343 uses preset algorithms and the CABC parameters stored in the second algorithm setting module 342 to process the analyzed data. For example, adjustment may be performed on the gray scale brightness of the to-be-displayed image, and the like. At the same time, the CABC module 343 outputs a pulse signal to a power management chip 350. The power management chip 350 controls output waveform of a backlight driving module 351 through a preset driving algorithm, and controls, through the output waveform, brightness of a light emitting diode 360 which is used as the backlight of the display screen 330. For example, when the processor 310 of the terminal transmits data of a picture to the driving chip 340, after calculating and analyzing the data of the picture, the image analyzer 341 automatically increases, through the CABC module 343, the gray scale brightness of the picture by 30% (the picture becomes brighter at this time) according to the preset algorithm, and then reduce, through the power management chip 350, the brightness of the backlight by 30% (the picture becomes dark at this time). For users, the display effect of the picture is almost the same as that of the picture not adjusted by the CABC module 343, but the backlight power consumption is reduced by 30%.

Figure 6:
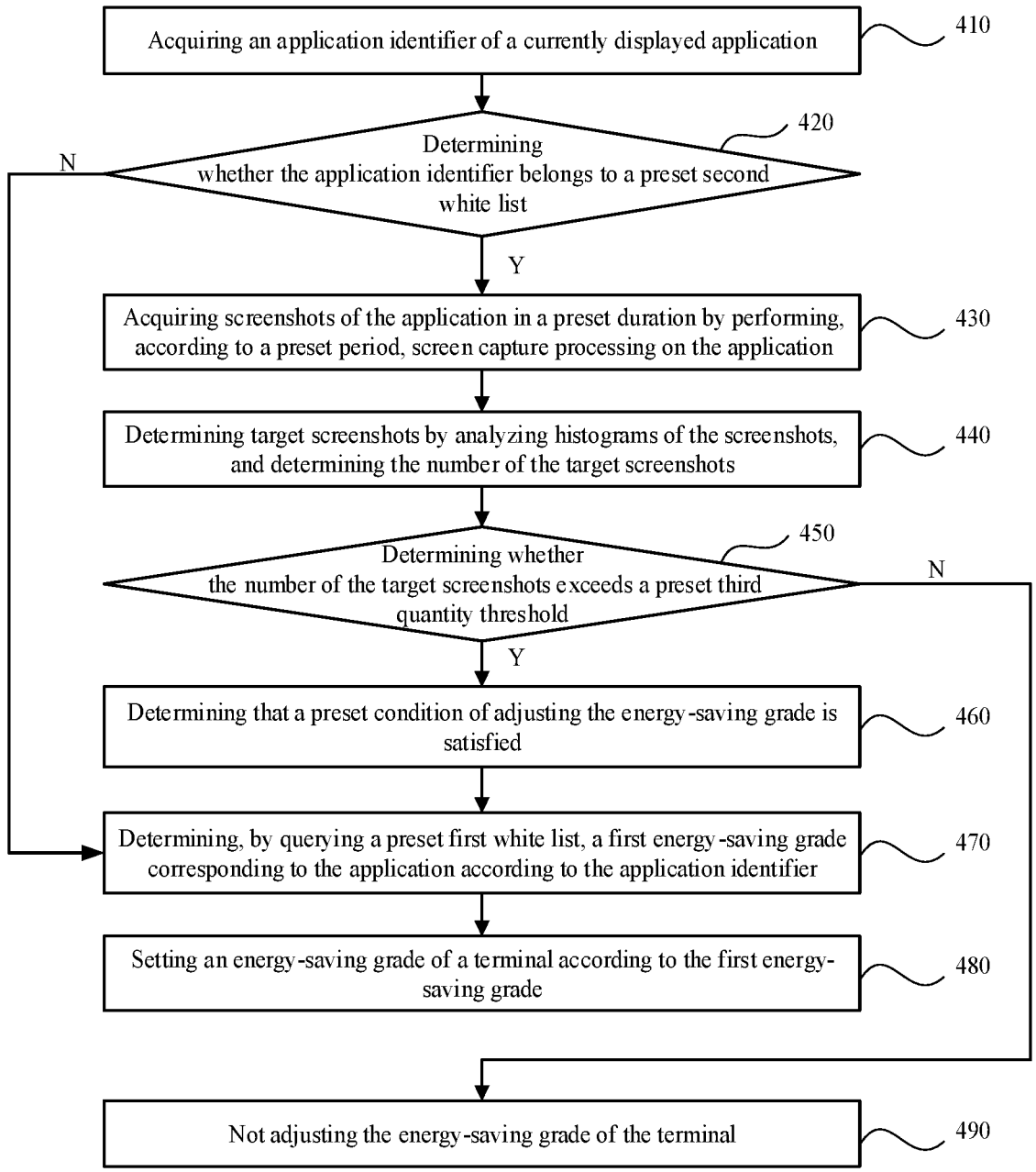
FIG. 6 is a flowchart of another method for dynamically adjusting an energy-saving grade of a terminal according to an implementation of the present disclosure.

FIG. 6 is a flowchart of another method for dynamically adjusting an energy-saving grade of a terminal according to an implementation of the present disclosure. The method includes the following actions at blocks illustrated in FIG. 6.

At block 410, an application identifier of a currently displayed application is acquired.

At block 420, a preset second white list is queried, and whether the application identifier belongs to the preset second white list is determined. If the application identifier belongs to the preset second white list, the action at block 430 is performed. If the application identifier doesn't belong to the preset second white list, the action at block 470 is performed.

The second white list may be pre-configured in the terminal before the terminal leaves the factory, or may be configured or updated by the users according to their own use requirements. Application identifiers within the second white list may include identifiers of video applications, games or e-books, and the like. The applications corresponding to the application identifiers in the second white list are given the rights to adjust the energy-saving grades, that is, if the application corresponding to the application identifier in the second white list is activated and a preset condition of adjusting the energy-saving grade is satisfied, the energy-saving grade of the terminal can be dynamically adjusted to the energy-saving grade corresponding to the application. In the implementation, the condition of adjusting the energy-saving grade is that the number of target screenshots exceeds a preset third number threshold.

At block 430, screen capture processing is performed on the application according to a preset cycle, to acquire screenshots of the application in a preset duration.

In the implementation, screen capture processing is performed according to the preset cycle by a screenshot thread, and screenshots corresponding to the image of the application is acquired. The screen capture processing can be understood as reading data in a frame buffer and saving the data as a picture. Since the frame buffer provides an interface to abstract the display device into a frame buffer, a synthesized display frame is written into the frame buffer to display the display frame. The application can be screenshot by reading the data in the frame buffer.

Alternatively, the application can be screenshot using the method provided by view.

It can be understood that, for the device based on the Android® system, the screen capture method is not limited to the manner enumerated in this implementation.

At block 440, target screenshots are determined by analyzing histograms of the screenshots, and the number of the target screenshots is determined.

In the implementation, the target screenshots are the screenshots that satisfy a first preset condition. The histogram can be understood as a schematic diagram of the distribution of the number of pixels obtained by counting the frequency of occurrence of all the pixels in the digital image according to the gray scale value (gray value or color gradation value).

In the implementation, the histogram of each target screenshots contains a plurality of target gray scales. The number of pixels corresponding to each target gray scale exceeds a preset first quantity threshold, and the first preset condition is that the number of the target gray scales contained in the histogram of the target screenshot exceeds a preset second quantity threshold. The more the number of the target gray scales is, the more delicate the image is. The power consumption of a series of operations such as rendering, compose, and display is usually higher.

For example, the gray scale histogram of the screenshot is determined. If the number of target gray scales exceeds the preset second quantity threshold, the screenshot is determined to be a target screenshot. In the above manner, the number of the target screenshots within a preset duration is determined. In the implementation, the first quantity threshold and the second quantity threshold are preset according to actual needs. The purpose of presetting the first quantity threshold is to reduce the situation where the noise point interferes with the operation of determining the target screenshot.

At block 450, whether the number of the target screenshots exceeds the preset third quantity threshold is determined. If the number of the target screenshots exceeds the preset third quantity threshold, the action at block 460 is performed. If the number of the target screenshots doesn't exceed the preset third quantity threshold, the action at block 490 is performed.

In the implementation, the number of the target screenshots is compared with the preset third quantity threshold.

At block 460, a second preset condition of adjusting the energy-saving grade is determined to be satisfied.

In the implementation, when the number of the target screenshots exceeds the preset third quantity threshold, it is determined that the second preset condition of adjusting the energy-saving grade is satisfied.

At block 470, a first energy-saving grade corresponding to the application is determined according to the application identifier by querying a preset first white list.

At block 480, an energy-saving grade of the terminal is set according to the first energy-saving grade.

At block 490, the energy-saving grade of the terminal is not adjusted.

In the implementation, when the number of the target screenshots does not exceed the preset third quantity threshold, it is determined that the application does not satisfy the second preset condition of adjusting the energy-saving grade. At this time, it is not necessary to adjust the energy-saving grade of the terminal.

According to the technical solution of the implementation, by presetting a condition of adjusting the energy-saving grade for the applications whose application identifiers being in the second white list, for the applications whose application identifiers being in the second white list, the priority of the display effect may be higher than that of the power-reducing process. That is, when the application whose application identifier being in the second white list satisfies the condition of adjusting the energy-saving grade, the dynamic adjustment of the energy-saving grade is performed, thereby achieving the purpose of reducing the power consumption and display effect of the terminal.

Figure 7:
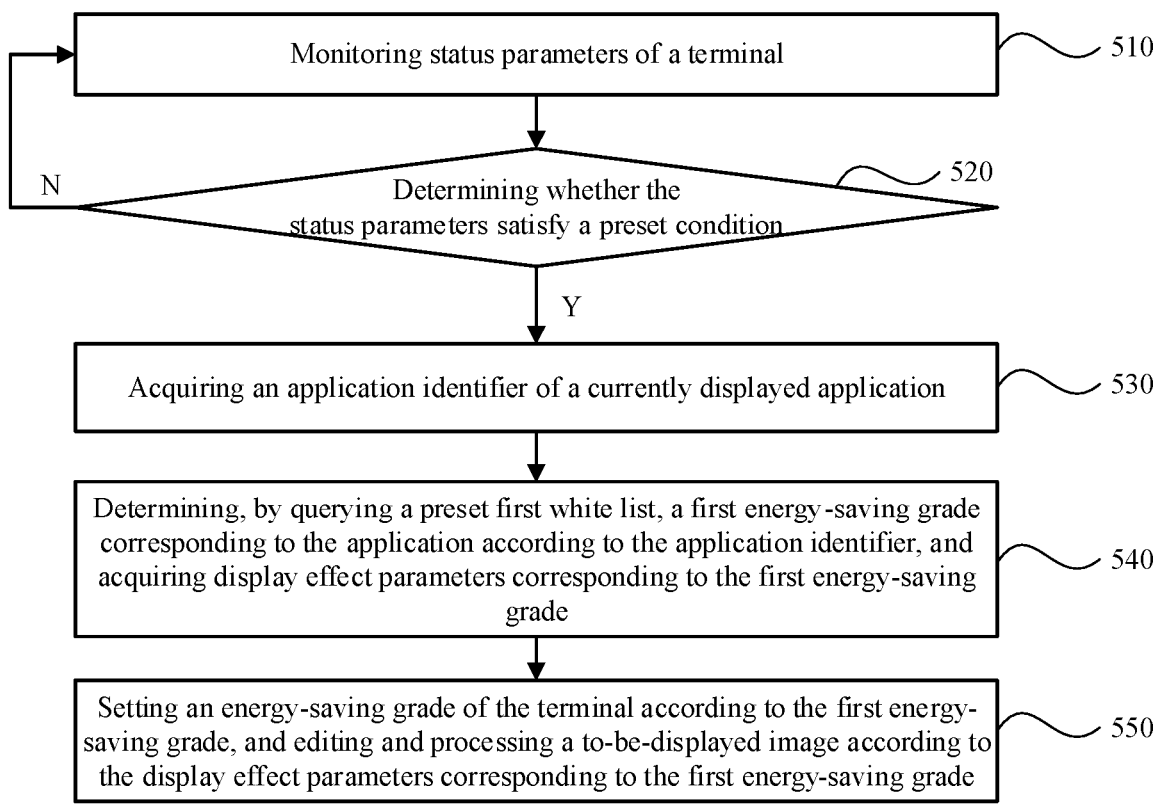
FIG. 7 is a flowchart of still another method for dynamically adjusting an energy-saving grade of a terminal according to an implementation of the present disclosure.

FIG. 7 is a flowchart of still another method for dynamically adjusting an energy-saving grade of a terminal according to an implementation of the present disclosure. The method includes the following actions at blocks illustrated in FIG. 7.

At block 510, status parameters of the terminal are monitored.

The status parameters include at least one of a battery power, a battery temperature, and a screen brightness.

The terminal acquires the status parameters by monitoring battery broadcast or screen broadcast. For example, the terminal acquires the parameters such as the battery power and the battery temperature by monitoring status information of the battery broadcast. The terminal can obtain the screen brightness parameter through a getScreenBrightness( ) function.

At block 520, whether the status parameters satisfy a third preset condition is determined. If the status parameters satisfy the third preset condition, the action at block 530 is performed. If the status parameters don't satisfy the third preset condition, the action at block 510 is performed.

For example, the status parameters include the battery power, and the battery power is compared with a preset power threshold. If the battery power is less than the preset power threshold, the battery power is considered to satisfy the third preset condition, and the action at block 530 is performed. Otherwise, the action at block 510 is performed.

For another example, the status parameters include the battery temperature, and the battery temperature is compared with a preset temperature threshold. If the battery temperature exceeds the preset temperature threshold, the battery temperature is considered to satisfy the third preset condition, and the action at block 530 is performed. Otherwise, the action at block 510 is performed.

For another example, the status parameters include the screen brightness, and the screen brightness (backlight brightness) is compared with a preset brightness threshold. If the screen brightness is higher than the preset brightness threshold, the screen brightness is considered to satisfy the third preset condition, and the action at block 530 is performed. Otherwise, the action at block 510 is performed.

It can be understood that the above examples do not cover all of the status parameters, and may also be other parameters that characterize the status of the terminal. In addition, the parameters listed in the above examples may also be used in combination, and the combination of any two of the above parameters is used to determine whether the status parameters satisfy the preset condition. Alternatively, the combination of the above three parameters may also be used to determine whether the status parameters satisfy the preset condition.

At block 530, an application identifier of a currently displayed application is acquired.

At block 540, a first energy-saving grade corresponding to the application is determined according to the application identifier by querying a preset first white list, and display effect parameters corresponding to the first energy-saving grade are acquired.

At block 550, an energy-saving grade of the terminal is set according to the first energy-saving grade, and a to-be-displayed image is processed according to the display effect parameters corresponding to the first energy-saving grade.

According to the technical solution of the implementation, an action of determining whether the current status of the terminal satisfies the condition of dynamically adjusting the energy-saving grade is added, that is, when the status of the terminal satisfies the preset condition of performing the dynamic adjustment of the energy-saving grade, the dynamic adjustment of the energy-saving grade is performed, thereby achieving the purpose of reducing the power consumption and display effect of the terminal.

Figure 8:
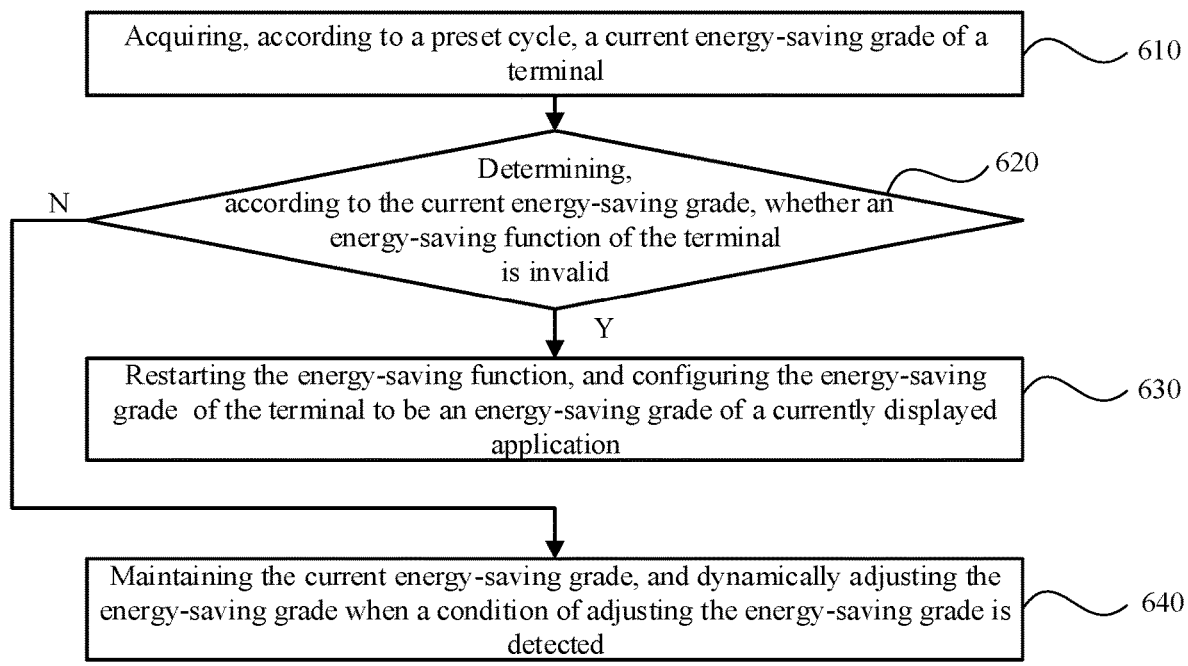
FIG. 8 is a schematic diagram of a recovery process after the energy-saving function is invalid according to an implementation of the present disclosure.

FIG. 8 is a schematic diagram of a recovery process after the energy-saving function is invalid according to an implementation of the present disclosure. The method includes the following actions at blocks illustrated in FIG. 8.

At block 610, a current energy-saving grade of a terminal is acquired according to a preset cycle.

According to the preset cycle, the effect parameters stored in an energy-saving module are acquired, and the current energy-saving grade is determined according to the effect parameters. The energy-saving module may include a FOSS module and a CABC module. For example, the FOSS module adjusts the color gradation value of the to-be-displayed image by using its stored effect parameter, and reduces a part of the color gradation on the basis of ensuring the display effect, so as to reduce the power consumption of the terminal. The CABC module adjusts the contrast of the to-be-displayed image by using the effect parameters, and at the same time reduces the backlight brightness, a thereby reducing the power consumption on the basis of ensuring the display effect.

At block 620, whether an energy-saving function of the terminal is invalid is determined according to the current energy-saving grade. If the energy-saving function of the terminal is invalid, the action at block 630 is performed. If the energy-saving function of the terminal isn't invalid, the action at block 640 is performed.

It is determined whether the current energy-saving grade is the energy-saving grade corresponding to the energy-saving function failure, and if so, the energy-saving function is considered to be invalid, otherwise, the energy-saving function is considered not to be invalid.

For example, if six FOSS grades (that is, grade 0 to grade 5) are preset for the current terminal, where the grade 0 indicates that the FOSS function is off. If the current energy-saving grade is grade 0, the energy-saving function is considered to be invalid.

At block 630, the energy-saving function is restarted, and the energy-saving grade of the terminal is configured to be an energy-saving grade of a currently displayed application.

In implementations, this action may be to restart the FOSS function, determine the corresponding FOSS grade according to the currently running application, and call the interface corresponding to the FOSS grade through the FOSS service layer to acquire the effect parameters corresponding to the FOSS grade. The effect parameters are sent to the FOSS module, so that the FOSS module updates its stored parameters according to the effect parameters.

At block 640, the current energy-saving grade is maintained, and the energy-saving grade is dynamically adjusted when a condition of adjusting the energy-saving grade is detected.

In the implementation, the condition of adjusting the energy-saving grade includes one of the following: the application displayed on the current screen changes, and the application identifier of the changed application doesn't belongs to the second white list; the application whose application identifier being in the second white list is started, and the number of the target screenshots exceeds the preset third threshold.

The technical solution of the implementation provides a recovering method after the energy-saving function is invalid. Whether the energy-saving function of the terminal is invalid is detected in real time. If yes, the energy-saving function is restarted, and the energy-saving grade is configured as the energy-saving grade corresponding to the currently displayed application, which realizes automatic restart energy-saving function after the energy-saving function is invalid, and can achieve the effect of reducing the power consumption and prolonging the endurance time.

According to an implementation of the present disclosure, an apparatus for dynamically adjusting an energy-saving grade of a terminal is provided. The apparatus includes the following.

An identifier acquisition module is configured to acquire an application identifier of a currently displayed application.

A grade determination module is configured to determine, by querying a preset first white list, a first energy-saving grade corresponding to the application according to the application identifier, and acquire display effect parameters corresponding to the first energy-saving grade, wherein the first white list defines an association relationship between a plurality of application identifiers and a plurality of energy-saving grades.

An energy-saving grade adjustment module is configured to set an energy-saving grade of the terminal according to the first energy-saving grade, and process a to-be-displayed image according to the display effect parameters corresponding to the first energy-saving grade.

In some implementations, the apparatus further includes a failure recovery module which is configured to: acquire a current energy-saving grade of the terminal according to a first preset cycle; determine whether an energy-saving function of the terminal is invalid according to the current energy-saving grade; and restart the energy-saving function in response to a determination that the energy-saving function of the terminal is invalid.

In some implementations, the apparatus further includes a condition determination module which is configured to: query a preset second white list, and determine whether the application identifier belongs to the preset second white list, wherein the preset second white list includes a plurality of application identifiers whose corresponding applications have rights to adjust their own energy-saving grades; in response to a determination that the application identifier belongs to the preset second white list, acquire screenshots of the application in a preset duration by performing, according to a second preset cycle, screen capture processing on the application; determine target screenshots by analyzing histograms of the screenshots, and determine the number of the target screenshots, wherein the target screenshots are the screenshots that satisfy a first preset condition, wherein the histogram of each target screenshots contains a plurality of target gray scales, wherein the number of pixels corresponding to each target gray scale exceeds a preset first quantity threshold, and the first preset condition is that the number of the target gray scales contained in the histogram of the target screenshot exceeds a preset second quantity threshold; and determine that a second preset condition of adjusting the energy-saving grade is satisfied when the number of target screenshots exceeds a preset third quantity threshold.

The grade determination module is configured to determine the first energy-saving grade corresponding to the application according to the application identifier when the second preset condition of adjusting the energy-saving grade is satisfied.

In some implementations, the apparatus further includes a status parameter monitoring module which is configured to monitor status parameters of the terminal, wherein the status parameters include at least one of a battery power, a battery temperature, and a screen brightness.

The identifier acquisition module is configured to acquire the application identifier of the currently displayed application when the status parameters satisfy a third preset condition.

In some implementations, the status parameter monitoring module is configured to compare the battery power with a preset power threshold when the status parameters include the battery power, and determine that the battery power satisfies the third preset condition in response to a determination that the battery power is less than the preset power threshold; or compare the battery temperature with a preset temperature threshold when the status parameters include the battery temperature, and determine that the battery temperature satisfies the third preset condition in response to a determination that the battery temperature exceeds the preset temperature threshold; or compare the screen brightness with a preset brightness threshold when the status parameters include the screen brightness, and determine that the screen brightness satisfies the third preset condition in response to a determination that the screen brightness is higher than the preset brightness threshold.

In some implementations, the grade determination module is specifically configured to read a fidelity optimized signal scaling (FOSS) configuration file by calling a preset configuration file access interface when the energy-saving grade is a FOSS grade, and acquire the display effect parameters corresponding to a first FOSS grade according to the FOSS configuration file, wherein the FOSS configuration file stores a plurality of FOSS grades, a plurality of groups of display effect parameters, and a mapping list defining an association relationship between the energy-saving grades and the display effect parameters.

The energy-saving grade adjustment module is specifically configured to transmit the display effect parameters to an algorithm setting module, to cause a FOSS module to adjust color gradation of the to-be-displayed image according to the display effect parameters received in the algorithm setting module and display the adjusted to-be-displayed image.

In some implementations, the energy-saving grade adjustment module is configured to: determine energy-saving grades respectively corresponding to each of at least two applications, when the currently displayed application includes the at least two applications; and compare the energy-saving grades respectively corresponding to each of the at least two applications, and adjusting the energy-saving grade of the terminal according to a lowest energy-saving grade among the energy-saving grades.

In some implementations, the energy-saving grade adjustment module is configured to: monitor operation frequencies respectively corresponding to each of at least two applications, when the currently displayed application includes the at least two applications; and compare the operation frequencies respectively corresponding to each of the at least two applications, and adjust the energy-saving grade of the terminal according to an energy-saving grade corresponding to an application with the highest operation frequency.

Figure 9:
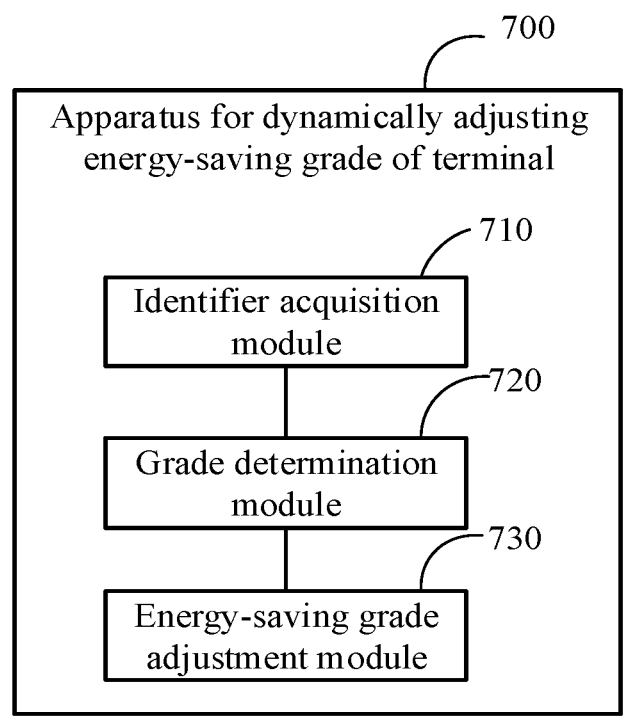
FIG. 9 is a schematic structural diagram of an apparatus for dynamically adjusting an energy-saving grade of a terminal according to an implementation of the present disclosure.

FIG. 9 is a schematic structural diagram of an apparatus for dynamically adjusting an energy-saving grade of a terminal according to an implementation of the present disclosure. The apparatus may be implemented by software and/or hardware, and may be integrated into a terminal. The energy-saving grade of the terminal may be controlled by performing a method of dynamically adjusting the energy-saving grade of the terminal. As illustrated in FIG. 9, the apparatus 700 includes an identifier acquisition module 710, a grade determination module 720, and an energy-saving grade adjustment module 730.

The identifier acquisition module 710 is configured to acquire an application identifier of a currently displayed application.

The grade determination module 720 is configured to determine, by querying a preset first white list, a first energy-saving grade corresponding to the application according to the application identifier, and acquire display effect parameters corresponding to the first energy-saving grade.

In the implementation, the first white list defines an association relationship between a plurality of application identifiers and a plurality of energy-saving grades.

The energy-saving grade adjustment module 730 is configured to set the energy-saving grade of the terminal according to the first energy-saving grade, and process a to-be-displayed image according to the display effect parameters corresponding to the first energy-saving grade.

The technical solution of the implementation provides an apparatus for dynamically adjusting the energy-saving grade of the terminal, the power consumption of the terminal can be dynamically adjusted according to the currently displayed application. The technical solution of the present disclosure can reduce the power consumption of the terminal while taking into account the display effect, and prolong the endurance time of the terminal.

Figure 10:
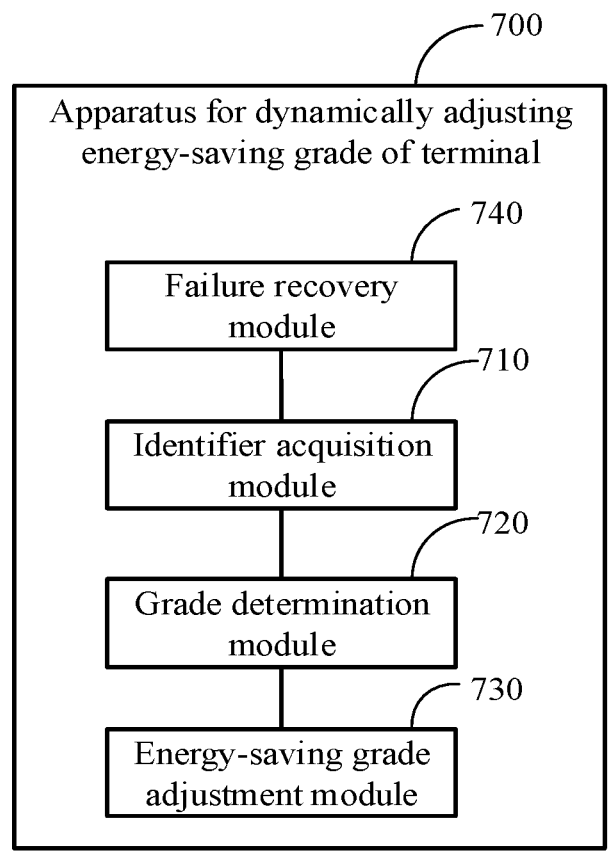
FIG. 10 is another schematic structural diagram of the apparatus for dynamically adjusting the energy-saving grade of the terminal according to an implementation of the present disclosure.

FIG. 10 is another schematic structural diagram of the apparatus for dynamically adjusting the energy-saving grade of the terminal according to an implementation of the present disclosure. In the implementation, the apparatus 700 further includes a failure recovery module 740.

The failure recovery module 740 is configured to acquire a current energy-saving grade of the terminal according to a first preset cycle before the application identifier of the currently displayed application is acquired, determine whether an energy-saving function of the terminal is invalid according to the current energy-saving grade, and restart the energy-saving function if the energy-saving function of the terminal is invalid.

Figure 11:
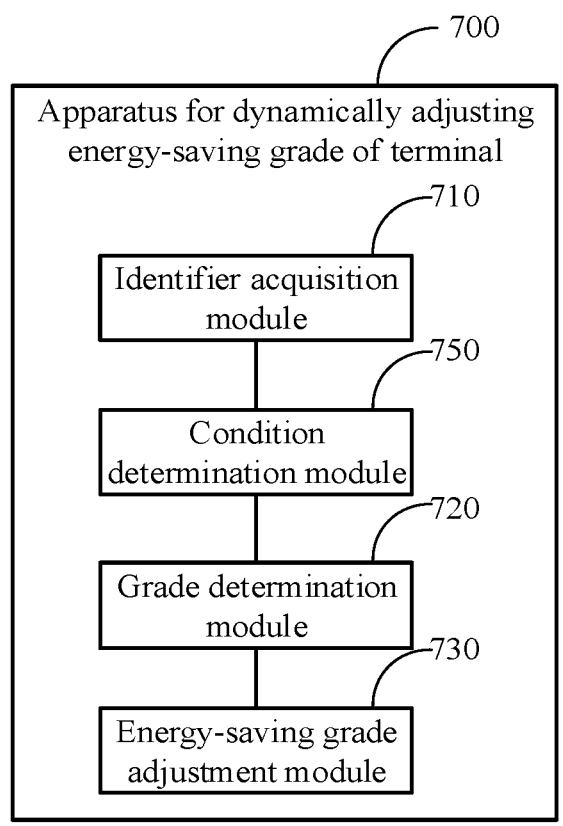
FIG. 11 is still another schematic structural diagram of the apparatus for dynamically adjusting the energy-saving grade of the terminal according to an implementation of the present disclosure.

FIG. 11 is still another schematic structural diagram of the apparatus for dynamically adjusting the energy-saving grade of the terminal according to an implementation of the present disclosure. In the implementation, the apparatus 700 further includes a condition determination module 750.

The condition determination module 750 is configured to query a preset second white list, and determine whether the application identifier belongs to a preset second white list. In the implementation, the preset second white list includes a plurality of application identifiers whose corresponding applications have rights to adjust their own energy-saving grades.

If the application identifier belongs to the preset second white list, the condition determination module 750 is further configured to acquire screenshots of the application in a preset duration by performing, according to a preset cycle, screen capture processing on the application.

The condition determination module 750 is further configured to determine target screenshots by analyzing histograms of the screenshots, and determine the number of the target screenshots.

In the implementation, the target screenshots are the screenshots that satisfy a first preset condition. The histogram of each target screenshots contains a plurality of target gray scales, where the number of pixels corresponding to each target gray scale exceeds a preset first quantity threshold. The first preset condition is that the number of the target gray scales contained in the histogram of the target screenshot exceeds a preset second quantity threshold.

The condition determination module 750 is further configured to determine that a second preset condition of adjusting the energy-saving grade is satisfied when the number of target screenshots exceeds a preset third quantity threshold.

In the implementation, the grade determination module 720 determines the first energy-saving grade corresponding to the application according to the application identifier when the second preset condition of adjusting the energy-saving grade is satisfied.

Figure 12:
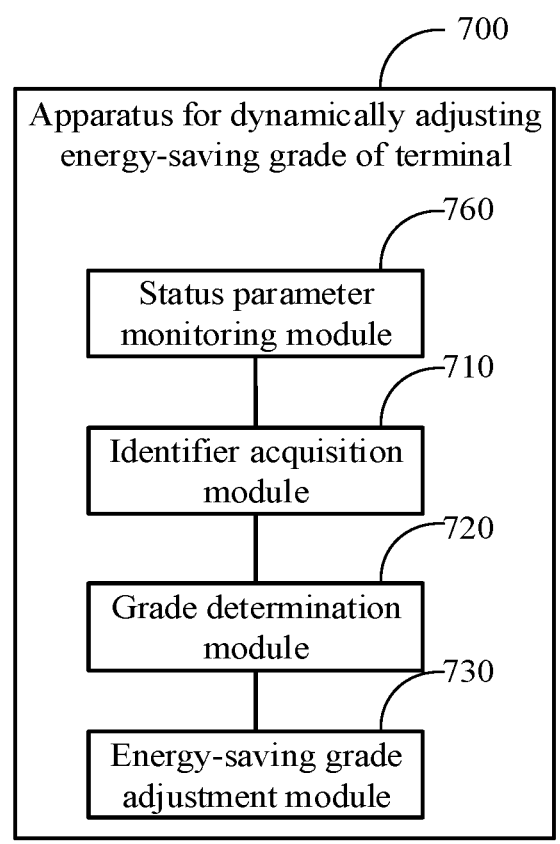
FIG. 12 is still another schematic structural diagram of the apparatus for dynamically adjusting the energy-saving grade of the terminal according to an implementation of the present disclosure.

FIG. 12 is still another schematic structural diagram of the apparatus for dynamically adjusting the energy-saving grade of the terminal according to an implementation of the present disclosure. In the implementation, the apparatus 700 further includes a status parameter monitoring module 760.

The status parameter monitoring module 760 is configured to monitor status parameters of the terminal before the application identifier of the currently displayed application is acquired. Where the status parameters include at least one of a battery power, a battery temperature, and a screen brightness.

In the implementation, the identifier acquisition module 710 acquires the application identifier of the currently displayed application when the status parameters satisfy a third preset condition.

In some implementations, the status parameter monitoring module 760 is configured to compare the battery power with a preset power threshold when the status parameters include the battery power, and determine that the battery power satisfies the third preset condition if the battery power is less than the preset power threshold.

Alternatively, the status parameter monitoring module 760 is configured to compare the battery temperature with a preset temperature threshold when the status parameters include the battery temperature, and determine that the battery temperature satisfies the third preset condition if the battery temperature exceeds the preset temperature threshold.

Alternatively, the status parameter monitoring module 760 is configured to compare the screen brightness with a preset brightness threshold when the status parameters include the screen brightness, and determine that the screen brightness satisfies the third preset condition if the screen brightness is higher than the preset brightness threshold.

In some implementations, the grade determination module 720 is specifically configured to read a FOSS configuration file by calling a preset configuration file access interface when the energy-saving grade is a fidelity optimized signal scaling (FOSS) grade, and acquire the display effect parameters corresponding to a first FOSS grade according to the FOSS configuration file. In the implementation, the FOSS configuration file stores a plurality of FOSS grades, a plurality of groups of display effect parameters, and a mapping list defining an association relationship between the energy-saving grades and the display effect parameters.

The energy-saving grade adjustment module 730 is specifically configured to transmit the display effect parameters to an algorithm setting module, to cause a FOSS module to adjust color gradation of the to-be-displayed image according to the display effect parameters received in the algorithm setting module and display the adjusted to-be-displayed image.

In some implementations, the energy-saving grade adjustment module 730 is configured to determine energy-saving grades respectively corresponding to each of at least two applications, when the currently displayed application includes the at least two applications; compare the energy-saving grades respectively corresponding to each of the at least two applications, and adjust the energy-saving grade of the terminal according to a lowest energy-saving grade among the energy-saving grades.

In some implementations, the energy-saving grade adjustment module 730 is configured to monitor operation frequencies respectively corresponding to each of at least two applications, when the currently displayed application includes the at least two applications; compare the operation frequencies respectively corresponding to each of the at least two applications, and adjust the energy-saving grade of the terminal according to an energy-saving grade corresponding to an application with the highest operation frequency.

In the implementation, the functions of the identifier acquisition module 710, the grade determination module 720, the energy-saving grade adjustment module 730, the failure recovery module 740, the condition determination module 750, and the status parameter monitoring module 760 may be implemented by a processor.

The implementation of the present disclosure further provides a terminal, which may include the apparatus for dynamically adjusting the energy-saving grade of the terminal provided by the implementation of the present disclosure.

Figure 13:
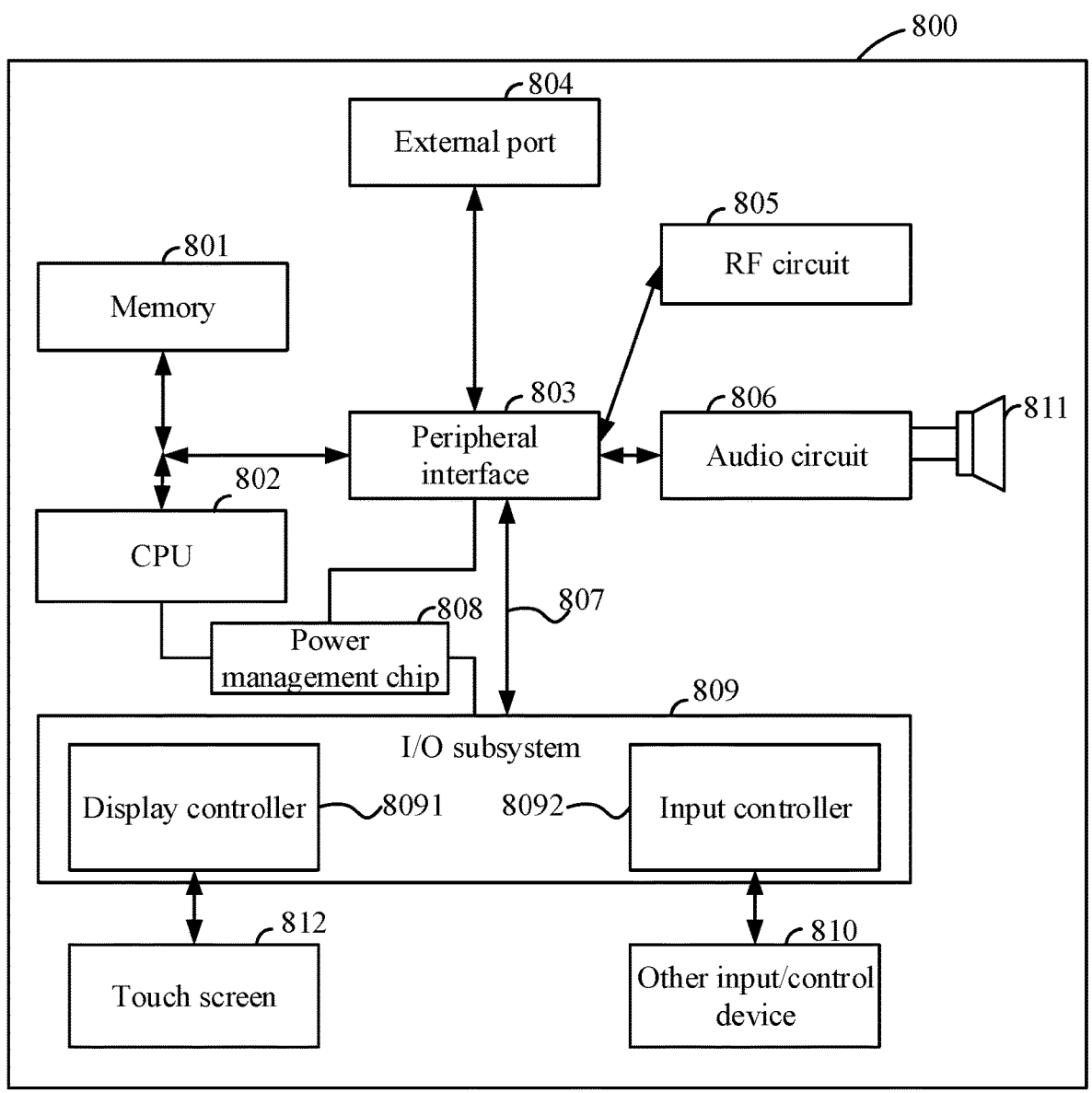
FIG. 13 is a schematic structural diagram of a terminal according to an implementation of the present disclosure.

FIG. 13 is a schematic structural diagram of a terminal according to an implementation of the present disclosure. As illustrated in FIG. 13, the terminal 800 may include a housing, a memory 801, at least one central processing unit (CPU) 802 (also referred to as a processor, hereinafter referred to as a CPU), and a circuit board, a touch screen 812 and a power supply circuit.

The touch screen 812 is configured to convert user operations into electrical signals and input the electrical signals to the processor 802, and display visual output signals. The circuit board is disposed inside a space enclosed by the touch screen 812 and the housing. The CPU 802 and the memory 801 are arranged on the circuit board. The power supply circuit is configured to supply power to each circuit or device of the terminal 800.

The memory 801 is configured to store computer programs. The CPU 802 reads and executes the computer programs stored in the memory 801. The CPU 802 performs the following when executing the computer programs: acquiring an application identifier of a currently displayed application; determining, by querying a preset first white list, a first energy-saving grade corresponding to the application according to the application identifier, wherein the first white list defines an association relationship between a plurality of application identifiers and a plurality of energy-saving grades; acquiring display effect parameters corresponding to the first energy-saving grade; and setting an energy-saving grade of the terminal according to the first energy-saving grade, and processing a to-be-displayed image according to the display effect parameters corresponding to the first energy-saving grade.

Specifically, in this implementation, the CPU 802 in the terminal 800 loads executable program codes corresponding to processes of one or more applications into the memory 801 according to corresponding instructions. The CPU 802 runs the program codes stored in the memory 801 to perform the above-described method of dynamically adjusting the energy-saving grade of the terminal, thereby realizing corresponding functions.

The above-mentioned actions can be referred to the foregoing method implementations, and details are not described herein again. The terminal 800 further includes a peripheral interface 803, a radio frequency (RF) circuit 805, an audio circuit 806, a speaker 811, a power management chip 808, an input/output (I/O) subsystem 809, a touch screen 812, other input/control devices 810, and an external port 804. These components communicate with each other via one or more communication buses or signal lines 807.

It should be understood that the illustrated terminal 800 is merely an example of the terminal. The terminal 800 may have more or fewer components than those illustrated in the figures, and may combine two or more components, or it may have different component configurations. The various components illustrated in the figures may be implemented in hardware, software, or a combination of hardware and software, including one or more signal processing and/or application specific integrated circuits.

The terminal for dynamically adjusting the energy-saving grade of the terminal provided in the present implementation is described in detail below. The terminal takes a mobile phone as an example.

The memory 801 can be accessed by the CPU 802, the peripheral interface 803, etc. The memory 801 may include a high-speed random access memory, and may also include a non-volatile memory, such as one or more magnetic disk storage devices, flash memory devices, or other volatile solid-state storage devices.

The peripheral interface 803 may connect input and output peripherals of the device to the CPU 802 and the memory 801.

The I/O subsystem 809 may connect the input and output peripherals of the device, such as the touch screen 812 and the other input/control devices 810, to the peripheral interface 803. The I/O subsystem 809 may include a display controller 8091 and one or more input controllers 8092 for controlling the other input/control devices 810. The one or more input controllers 8092 receive electrical signals from the other input/control devices 810 or transmit electrical signals to the other input/control devices 810. The other input/control devices 810 may include physical buttons (such as press buttons, rocker buttons, etc.), dials, slide switches, joysticks, click wheels, etc. It is worth noting that the input controller 8092 may be connected to any of the following: a keyboard, an infrared port, a USB interface, and a pointing device such as a mouse.

The touch screen 812 is an input and output interface between a user terminal and a user, and displays the visual output to the user. The visual output may include graphics, text, icons, videos, etc.

The display controller 8091 in the I/O subsystem 809 receives electrical signals from the touch screen 812 or transmits electrical signals to the touch screen 812. The touch screen 812 detects contact on the touch screen, and the display controller 8091 converts the detected contact into interaction with a user interface object displayed on the touch screen 812, that is, to realize human-computer interaction. The user interface object displayed on the touch screen 812 may be icons for running games, icons for networking to corresponding networks, etc. It is worth noting that the device may also include a photomouse, which is a touch sensitive surface that does not display visual output, or an extension of a touch sensitive surface formed by the touch screen.

The RF circuit 805 is mainly used for establishing communication between the mobile phone and wireless network (i.e., network side) to realize data reception and transmission between the mobile phone and the wireless network. For example, sending and receiving short messages, e-mails, etc. Specifically, the RF circuit 805 receives and transmits an RF signal, which is also referred to as an electromagnetic signal. The RF circuit 805 converts an electrical signal into an electromagnetic signal or converts an electromagnetic signal into an electrical signal, and communicates with a communication network and other devices through the electromagnetic signal. The RF circuitry 805 may include known circuits for performing these functions, including but not limited to an antenna system, an RF transceiver, one or more amplifiers, a tuner, one or more oscillators, a digital signal processor, a coder-decoder (CODEC) chipset, a subscriber identity module (SIM), etc.

The audio circuit 806 is mainly configured to receive audio data from the peripheral interface 803, convert the audio data into an electrical signal, and transmit the electrical signal to the speaker 811.

The speaker 811 is configured to restore a voice signal received by the mobile phone from the wireless network through the RF circuit 805 to sound, and play the sound to the user.

The power management chip 808 is configured for power supply and power management of the hardware connected to the CPU 802, the I/O subsystem 809, and the peripheral interface 803.

The apparatus and the terminal for dynamically adjusting the energy-saving grade of the terminal provided in the above implementations may perform the method for dynamically adjusting the energy-saving grade of the terminal provided by any implementation of the present disclosure, and have the corresponding functional modules and beneficial effects for performing the method. For technical details that are not described in detail in the above implementations, references may be made to the method for dynamically adjusting the energy-saving grade of the terminal provided by any implementation of the present disclosure.

The implementation of the present disclosure further provides a non-transitory computer readable storage medium, on which computer programs are stored. When the computer programs are run on a computer, the computer is caused to perform the following operations: acquiring an application identifier of a currently displayed application; determining, by querying a preset first white list, a first energy-saving grade corresponding to the application according to the application identifier, wherein the first white list defines an association relationship between a plurality of application identifiers and a plurality of energy-saving grades; acquiring display effect parameters corresponding to the first energy-saving grade; and setting an energy-saving grade of the terminal according to the first energy-saving grade, and processing a to-be-displayed image according to the display effect parameters corresponding to the first energy-saving grade.

It should be noted that the specific implementation process of the present implementations may be referred to the specific implementation process described in the foregoing method implementations, and is not described herein.

It should be noted that, for the method of the present disclosure, ordinary testers in the field can understand that all or part of the process of implementing the method in the implementation of the present disclosure can be accomplished by controlling related hardware through computer programs. The computer programs may be stored in a computer readable storage medium, such as in the memory of the terminal, and executed by at least one processor in the terminal. The execution process may include the flows of the implementations of the method. The storage medium may be a magnetic disk, an optical disk, a read-only memory (ROM), a random-access memory (RAM), or the like.

For the apparatus of the implementation of the present disclosure, each functional module may be integrated into one processing chip, or each module may exist physically separately, or two or more modules may be integrated into one module. The above integrated modules can be implemented in the form of hardware or in the form of software functional modules. If the integrated module is implemented in the form of a software functional module and sold or used as a standalone product, it may also be stored in a computer readable storage medium, such as a read-only memory, a magnetic disk or an optical disk, etc.

It should be noted that, the above are only the preferred implementations of the present disclosure and the technical principles applied thereto. Those skilled in the art will understand that the present disclosure is not limited to the specific implementations described herein. Various obvious changes, readjustments and substitutions that can be made by those skilled in the art will not depart from the scope of the disclosure. Therefore, although the present disclosure has been described in detail by the above implementations, the present disclosure is not limited to the above implementations, but may include more equivalent implementations without departing from the concept of the present disclosure. The scope of the present disclosure is determined by the scope of the claims.

What is claimed is:

1. A method for dynamically adjusting an energy-saving grade of a terminal, comprising:
    acquiring an application identifier of a currently displayed application;
    determining, by querying a preset first white list, a first energy-saving grade corresponding to the application according to the application identifier, wherein the first white list defines an association relationship between a plurality of application identifiers and a plurality of energy-saving grades;
    acquiring display effect parameters corresponding to the first energy-saving grade; setting an energy-saving grade of the terminal according to the first energy-saving grade, and processing a to-be-displayed image according to the display effect parameters corresponding to the first energy-saving grade;
    acquiring, according to a first preset cycle, a current energy-saving grade of the terminal;
    determining, according to the current energy-saving grade, whether an energy-saving function of the terminal is invalid; and
    restarting the energy-saving function in response to a determination that the energy-saving function of the terminal is invalid.

2. The method of claim 1, wherein the method further comprises:
    querying a preset second white list, and determining whether the application identifier belongs to the preset second white list, wherein the preset second white list comprises a plurality of application identifiers whose corresponding applications have rights to adjust their own energy-saving grades;
    in response to a determination that the application identifier belongs to the preset second white list, acquiring screenshots of the application in a preset duration by performing, according to a second preset cycle, screen capture processing on the application;
    determining target screenshots by analyzing histograms of the screenshots, and determining a number of the target screenshots, wherein the target screenshots are the screenshots that satisfy a first preset condition, wherein the histogram of each target screenshots contains a plurality of target gray scales, wherein the number of pixels corresponding to each target gray scale exceeds a preset first quantity threshold, and the first preset condition is that the number of the target gray scales contained in the histogram of the target screenshot exceeds a preset second quantity threshold; and
    determining that a second preset condition of adjusting the energy-saving grade is satisfied when the number of target screenshots exceeds a preset third quantity threshold, and performing the action of determining the first energy-saving grade corresponding to the application according to the application identifier.

3. The method of claim 1, wherein the method further comprises:
    monitoring status parameters of the terminal, wherein the status parameters comprise at least one of: a battery power, a battery temperature, and a screen brightness; and
    performing the action of acquiring the application identifier of the currently displayed application when the status parameters satisfy a third preset condition.

4. The method of claim 3, wherein the status parameters comprise the battery power, and the method further comprises:
    comparing the battery power with a preset power threshold; and
    determining that the battery power satisfies the third preset condition in response to a determination that the battery power is less than the preset power threshold.

5. The method of claim 3, wherein the status parameters comprise the battery temperature, and the method further comprises:
    comparing the battery temperature with a preset temperature threshold; and
    determining that the battery temperature satisfies the third preset condition in response to a determination that the battery temperature exceeds the preset temperature threshold.

6. The method of claim 3, wherein the status parameters comprise the screen brightness, and the method further comprises:
    comparing the screen brightness with a preset brightness threshold; and
    determining that the screen brightness satisfies the third preset condition in response to a determination that the screen brightness is higher than the preset brightness threshold.

7. The method of claim 1, wherein when the energy-saving grade is a fidelity optimized signal scaling (FOSS) grade, acquiring the display effect parameters corresponding to the first energy-saving grade comprises:
    reading a FOSS configuration file by calling a preset configuration file access interface, and acquiring the display effect parameters corresponding to a first FOSS grade according to the FOSS configuration file, wherein the FOSS configuration file stores a plurality of FOSS grades, a plurality of groups of display effect parameters, and a mapping list defining an association relationship between the energy-saving grades and the display effect parameters; and
    wherein processing the to-be-displayed image according to the display effect parameters corresponding to the first energy-saving grade comprises:
        transmitting the display effect parameters to an algorithm setting module, to cause a FOSS module to adjust color gradation of the to-be-displayed image according to the display effect parameters received in the algorithm setting module and display the adjusted to-be-displayed image.

8. The method of claim 1, wherein setting the energy-saving grade of the terminal according to the first energy-saving grade, and processing the to-be-displayed image according to the display effect parameters corresponding to the first energy-saving grade comprises:

determining energy-saving grades respectively corresponding to each of at least two applications, when the currently displayed application comprises the at least two applications; and comparing the energy-saving grades respectively corresponding to each of the at least two applications, and adjusting the energy-saving grade of the terminal according to a lowest energy-saving grade among the energy-saving grades.

9. The method of claim 1, wherein setting the energy-saving grade of the terminal according to the first energy-saving grade, and processing the to-be-displayed image according to the display effect parameters corresponding to the first energy-saving grade comprises:

monitoring operation frequencies respectively corresponding to each of at least two applications, when the currently displayed application comprises the at least two applications; and comparing the operation frequencies respectively corresponding to each of the at least two applications, and adjusting the energy-saving grade of the terminal according to an energy-saving grade corresponding to an application with the highest operation frequency.

10. A terminal, comprising:

a processor; and a memory coupled to the processor and storing computer programs thereon, which when executed by the processor, cause the processor to:

acquire an application identifier of a currently displayed application;

determine, by querying a preset first white list, a first energy-saving grade corresponding to the application according to the application identifier, and acquire display effect parameters corresponding to the first energy-saving grade, wherein the first white list defines an association relationship between a plurality of application identifiers and a plurality of energy-saving grades;

set an energy-saving grade of the terminal according to the first energy-saving grade, and process a to-be-displayed image according to the display effect parameters corresponding to the first energy-saving grade;

read a fidelity optimized signal scaling (FOSS) configuration file by calling a preset configuration file access interface when the energy-saving grade is a FOSS grade, and acquire the display effect parameters corresponding to a first FOSS grade according to the FOSS configuration file, wherein the FOSS configuration file stores a plurality of FOSS grades, a plurality of groups of display effect parameters, and a mapping list defining an association relationship between the energy-saving grades and the display effect parameters; and transmit the display effect parameters to an algorithm setting module, to cause a FOSS module to adjust color gradation of the to-be-displayed image according to the display effect parameters received in the algorithm setting module and display the adjusted to-be-displayed image.

11. The terminal of claim 10, wherein the computer programs further cause the processor to:

acquire a current energy-saving grade of the terminal according to a first preset cycle;

determine whether an energy-saving function of the terminal is invalid according to the current energy-saving grade; and restart the energy-saving function in response to a determination that the energy-saving function of the terminal is invalid.

12. The terminal of claim 10, wherein the computer programs further cause the processor to:

query a preset second white list, and determine whether the application identifier belongs to the preset second white list, wherein the preset second white list comprises a plurality of application identifiers whose corresponding applications have rights to adjust their own energy-saving grades;

in response to a determination that the application identifier belongs to the preset second white list, acquire screenshots of the application in a preset duration by performing, according to a second preset cycle, screen capture processing on the application;

determine target screenshots by analyzing histograms of the screenshots, and determine a number of the target screenshots, wherein the target screenshots are the screenshots that satisfy a first preset condition, wherein the histogram of each target screenshots contains a plurality of target gray scales, wherein the number of pixels corresponding to each target gray scale exceeds a preset first quantity threshold, and the first preset condition is that the number of the target gray scales contained in the histogram of the target screenshot exceeds a preset second quantity threshold; and determine that a second preset condition of adjusting the energy-saving grade is satisfied when the number of target screenshots exceeds a preset third quantity threshold, and perform the action of determining the first energy-saving grade corresponding to the application according to the application identifier.

13. The terminal of claim 10, wherein the computer programs further cause the processor to:

monitor status parameters of the terminal, wherein the status parameters comprise at least one of a battery power, a battery temperature, and a screen brightness; and perform the action of acquiring the application identifier of the currently displayed application when the status parameters satisfy a third preset condition.

14. The terminal of claim 13, wherein the computer programs further cause the processor to:

compare the battery power with a preset power threshold when the status parameters comprise the battery power, and determine that the battery power satisfies the third preset condition in response to a determination that the battery power is less than the preset power threshold; or compare the battery temperature with a preset temperature threshold when the status parameters comprise the battery temperature, and determine that the battery temperature satisfies the third preset condition in response to a determination that the battery temperature exceeds the preset temperature threshold; or compare the screen brightness with a preset brightness threshold when the status parameters comprise the screen brightness, and determine that the screen brightness satisfies the third preset condition in response to a determination that the screen brightness is higher than the preset brightness threshold.

15. The terminal of claim 10, wherein the computer programs further cause the processor to:

determine energy-saving grades respectively corresponding to each of at least two applications, when the currently displayed application comprises the at least two applications; and compare the energy-saving grades respectively corresponding to each of the at least two applications, and adjusting the energy-saving grade of the terminal according to a lowest energy-saving grade among the energy-saving grades.

16. The terminal of claim 10, wherein the computer programs further cause the processor to:
monitor operation frequencies respectively corresponding to each of at least two applications, when the currently displayed application comprises the at least two applications; and
compare the operation frequencies respectively corresponding to each of the at least two applications, and adjust the energy-saving grade of the terminal according to an energy-saving grade corresponding to an application with the highest operation frequency.

17. A non-transitory computer-readable storage medium storing computer programs which, when executed by a processor, cause the processor to:
acquire an application identifier of a currently displayed application;
determine, by querying a preset first white list, a first energy-saving grade corresponding to the application according to the application identifier, wherein the first white list defines an association relationship between a plurality of application identifiers and a plurality of energy-saving grades;
acquire display effect parameters corresponding to the first energy-saving grade;
set an energy-saving grade of a terminal according to the first energy-saving grade, and process a to-be-displayed image according to the display effect parameters corresponding to the first energy-saving grade;
query a preset second white list, and determining whether the application identifier belongs to the preset second white list, wherein the preset second white list comprises a plurality of application identifiers whose corresponding applications have rights to adjust their own energy-saving grades;
in response to a determination that the application identifier belongs to the preset second white list, acquire screenshots of the application in a preset duration by performing, according to a second preset cycle, screen capture processing on the application;
determine target screenshots by analyzing histograms of the screenshots, and determine a number of the target screenshots, wherein the target screenshots are the screenshots that satisfy a first preset condition, wherein the histogram of each target screenshots contains a plurality of target gray scales, wherein the number of pixels corresponding to each target gray scale exceeds a preset first quantity threshold, and the first preset condition is that the number of the target gray scales contained in the histogram of the target screenshot exceeds a preset second quantity threshold; and
determine that a second preset condition of adjusting the energy-saving grade is satisfied when the number of target screenshots exceeds a preset third quantity threshold, and perform the action of determining the first energy-saving grade corresponding to the application according to the application identifier.

* * * * *

UNITED STATES PATENT AND TRADEMARK OFFICE
CERTIFICATE OF CORRECTION

PATENT NO. : 10,952,146 B2  
APPLICATION NO. : 16/565344  
DATED : March 16, 2021  
INVENTOR(S) : Yongpeng Yi et al.

Page 1 of 1

It is certified that error appears in the above-identified patent and that said Letters Patent is hereby corrected as shown below:

On the Title Page

Item (71) Applicant: please delete "Guangdong Oppo Mobile Telecommunications Corp., Ltd., Guangdong (CN)" and insert -- GUANGDONG OPPO MOBILE TELECOMMUNICATIONS CORP., LTD., Dongguan (CN) --

Item (73) Assignee: please delete "GUANGDONG OPPO MOBILE TELECoMMUNICATIONS CORP., LTD., Dongguan (CN)" and insert -- GUANGDONG OPPO MOBILE TELECOMMUNICATIONS CORP., LTD., Dongguan (CN) --

Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*